Patented Dec. 5, 1933

1,937,813

UNITED STATES PATENT OFFICE 1,937,813

PRESERVATIVE COMPOUND AND METHOD OF PRODUCING THE SAME

Hyman Deitchman, Chicago, Ill.

No Drawing. Application March 29, 1929
Serial No. 351,118

2 Claims. (Cl. 260—2)

This invention involves a novel compound of a colloidal nature having strong preservative properties and one which may be used as a plastic material, as a binder and preservative, as a varnish or lacquer, as an ingredient of painting compounds etc. Its preservative and physical properties are such for example as to make it particularly useful for the protection and preservation of works of art similarly to the vehicle used by the Ancients and the Venetian School in their paintings.

The invention consists in the compound itself and in the method by which it is produced.

As a preliminary to a detailed discussion of the ingredients used, their composite elements and the manner in which they are combined, I may state that one of the substances entering into my compound is colloidal, while all of the ingredients have complicated molecular compositions but with a powerful chemical affinity forming extremely stable compounds. When combined as hereinafter stated, they provide a substance of an antiseptic preservative nature highly resistant to solvents, such as water, alcohol, and turpentine, separately or together, and alkaline solutions such as the hydroxides of sodium, potassium and ammonium.

Briefly stated, the compound is composed and made by subjecting animal and vegetable colloidal substances, separately or together, to the action of creosotes such as are derived from the distillation of vegetable matter, wood, wood tar, resinous exudates and organic compounds, under the inflence of heat.

As a specific instance, illustrative but not restrictive of the invention, I may take a colloidal substance such as gelatin, and wood creosote, in the proportions, substantially of 3 and 4, respectively, and gradually heat them for about two hours at a temperature between 160° and 250° C. in a vessel provided with a reflux condenser. The vapors are collected as a clear liquid in the vessel and this liquid on cooling forms a colloidal mass having both brilliancy and transparency and unusual resistance toward solvents such as the water, alcohol, ether, etc. heretofore referred to, as well as antiseptic and preservative properties, qualities which particularly recommend its use as a preservative for works of art both as to the base material and colors.

Creosotes have the property of combining with colloidal substances, animal tissue, etc. to form powerfully antiseptic and preservative bodies, so that my compound has a wide field of use not limited to painting preservation but extensible to varied fields of use as a preservative binder or coating.

The colloidal substance which may be in the nature of gelatin or glue, for example, has the property of solidifying when cooling and of becoming liquid again, when subjected to heat and has a distinct chemical affinity for creosote.

The creosote, also a colloidal substance, will vary in its composition, depending upon the mother substance. It may be obtained by fractional distillation of crude pyroligneous acid. The latter, also called pyroligneous vinegar, is secured by the destructive distillation of wood, coal tar, wood tar, resinous exudates of trees (such as guaiac resin, the juice of mimosa catechu, etc.) carbo-hydrates (such as cane sugar, sugar waste, glucose, albumen, pentosan, vegetable waste, etc.).

Wood creosote contains phenoloid bodies and may be regarded as consisting of a mixture of compounds included in several homologous series, chiefly of methylic ethers of catechol, and the presence of the following bodies has been established: cresols, guaiacol, homocreosol and etc. The two principal constituents of creosote are guaiacol and creosol.

The boiling and distilling points will differ with the different mother substances from which the creosotes are derived. I may employ these various creosotes, individually or in combination, or their synthetic chemical equivalents.

In all cases, I have discovered that creosote has the property, to a remarkable degree, of combining with certain colloidal substances to form compounds of powerful antiseptic natures and great resistance to solvents. The colloidal substances derived from animal and vegetable matter may be used either singly or together in combination with the creosotes. I have found that vegetable colloidal substances, such as gums, resins, and resinous exudates combine with creosote under heat treatment to form compounds similar to natural rubber. Glue derived from animal matter in a similar manner when combined with creosote forms a compound resembling natural rubber.

The creosotes or distillates and the colloidal substances employed have boiling points ranging from 160° to 300° and the mixture is subjected to a moderate heat ranging between 165° and 250° C., the result being distillation. The product thus formed as a result of distillation is cooled to form a liquid and on further cooling a solid mass which assumes a colloidal form separates out.

The gelatin acts chemically like an aldehyde and the creosote like phenol under the influence of heat and condensation. No definite empirical formula has been established for gelatin, and the great majority of colloidal substances derived from animal and vegetable products are of similar status. They chemically combine with creosote, however, with resultant products having physical and chemical properties different from those of the mother substances,—i. e., such products become insoluble, infusible, and hard and strong after being heated.

What I claim, therefore, and desire to secure by Letters Patent is:

1. The method of making a preservative compound which consists in heating gelatine and wood creosote to a temperature of between 160° and 250° centigrade to form vapors, cooling said vapors to form a liquid and further cooling to cause the liquid to form a colloidal mass.

2. An antiseptic and preservative compound comprising a colloidal solid formed from a heated mixture of gelatine and wood creosote, the solid being brilliant, transparent and resistant toward solvents.

HYMAN DEITCHMAN.